United States Patent
Grilliot et al.

[19]

[11] Patent Number: 5,636,901
[45] Date of Patent: Jun. 10, 1997

[54] AIRCRAFT PASSENGER SEAT FRAME

[75] Inventors: Ronald Grilliot, Plantation; Patrick Murphy, Miami, both of Fla.

[73] Assignee: Aircraft Modular Products, Inc., Miami, Fla.

[21] Appl. No.: 490,791

[22] Filed: Jun. 15, 1995

[51] Int. Cl.[6] .................................................. A47C 7/02
[52] U.S. Cl. ........................ 297/452.18; 297/452.2; 297/452.55; 297/216.1; 297/362.13; 248/188.1
[58] Field of Search .......................... 297/452.18, 452.2, 297/362.13, 216.1, 216.3, 243, 248, 452.55; 248/440.1, 188.1

[56] References Cited

U.S. PATENT DOCUMENTS

| | | | |
|---|---|---|---|
| 3,744,844 | 7/1973 | Nomaki et al. | 297/362.13 |
| 3,785,600 | 1/1974 | Padovano | 248/188.1 |
| 3,807,796 | 4/1974 | Wirges | 297/362.13 |
| 3,893,729 | 7/1975 | Sherman et al. | 248/188.1 X |
| 4,229,040 | 10/1980 | Howell et al. | 297/248 X |
| 4,372,608 | 2/1983 | Hotta | 297/362.13 |
| 4,375,300 | 3/1983 | Long et al. | 248/188.1 X |
| 4,489,978 | 12/1984 | Brennan | 248/188.1 |
| 4,630,864 | 12/1986 | Toll | 297/216.1 X |
| 4,761,036 | 8/1988 | Vogel | 297/452.18 |
| 5,029,942 | 7/1991 | Rink | 297/452.18 |
| 5,224,755 | 7/1993 | Beruth | 297/216.1 X |
| 5,310,247 | 5/1994 | Fujimori et al. | 297/452.18 X |
| 5,318,341 | 6/1994 | Griswold et al. | 297/452.18 X |
| 5,382,083 | 1/1995 | Fectiau et al. | 297/452.2 |
| 5,447,360 | 9/1995 | Hewko et al. | 297/452.18 |
| 5,452,941 | 9/1995 | Halse et al. | 297/452.2 X |
| 5,485,976 | 1/1996 | Creed et al. | 297/452.55 X |
| 5,501,509 | 3/1996 | Urrutia | 297/452.18 |
| 5,553,923 | 9/1996 | Bilezikjlan | 297/452.2 |

FOREIGN PATENT DOCUMENTS

| | | | |
|---|---|---|---|
| 3010662 | 9/1981 | Germany | 297/452.18 |
| 4160465 | 12/1979 | Japan | 297/452.18 |
| 2126476 | 3/1984 | United Kingdom | 297/452.18 |

*Primary Examiner*—Peter M. Cuomo
*Assistant Examiner*—Rodney B. White
*Attorney, Agent, or Firm*—Malloy & Malloy, P.A.

[57] ABSTRACT

An aircraft seat frame including a seat back portion, a seat foundation portion, and a seat base portion, the seat back portion having a pair of generally vertically disposed side rails composed of three interconnected segments, a leading and a trailing edge segments of which are perpendicularly disposed on opposing sides of an interior segment, thereby substantially minimizing an overall weight of the side rails and maximizing the side rails resistance to horizontal bending across a plane of the leading and trailing segments. Further, the seat frame includes a load transference member spanning the side rails so as to evenly distribute a load exerted on only a single of the side rails over both side rails and over the corresponding seat side rails to which the seat back side rails are connected. Further, the frame includes a seat base portion having a pair of seat side rails with support members pivotally secured at opposite ends thereof, the support members being fixedly secured to an underlying support surface.

15 Claims, 2 Drawing Sheets

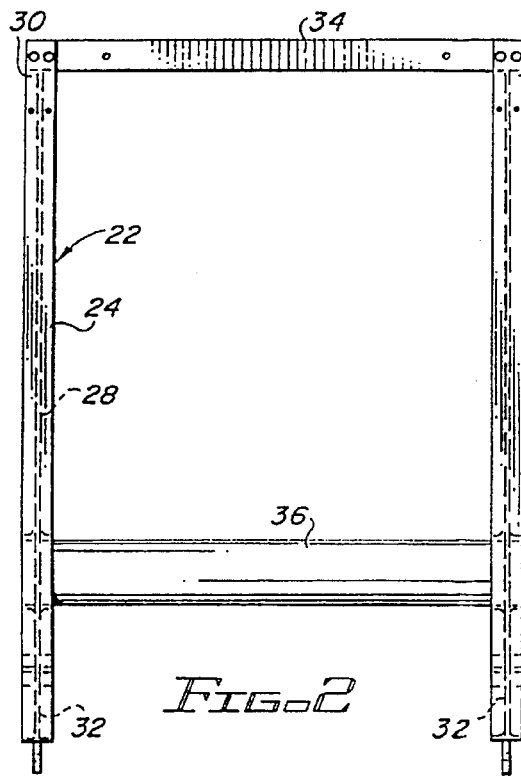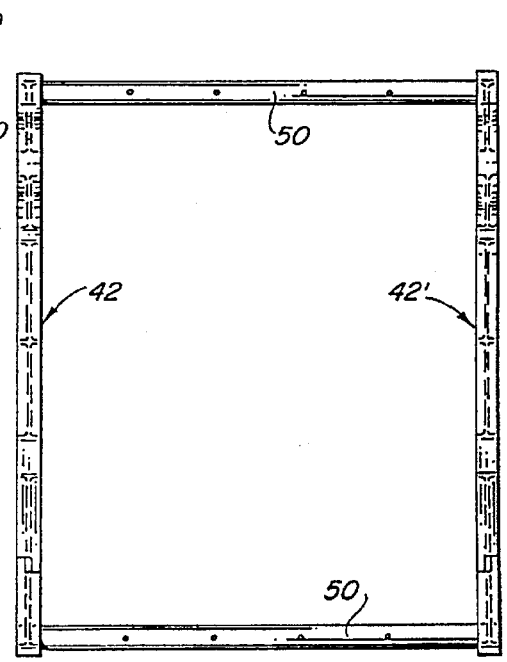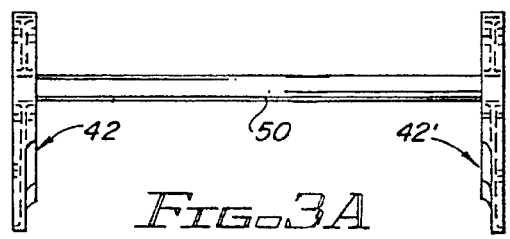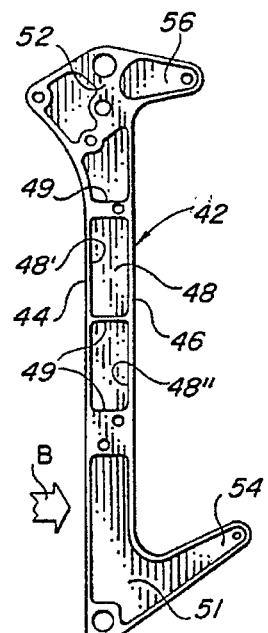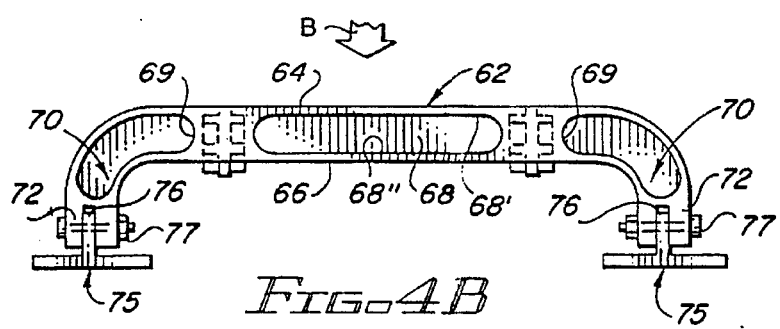

AIRCRAFT PASSENGER SEAT FRAME

BACKGROUND OF THE INVENTION

1. Field of the Invention

The present invention relates to an aircraft passenger seat frame which is structured to be relatively lightweight, but has an increased strength-to-weight ratio which is capable of withstanding substantial forces, as set by various dynamic and static testing criteria of the Federal Aviation Association (FAA) for aircraft seating.

2. Description of the Related Art

The field of art relating to aircraft passenger seating, and especially custom aircraft seating is very specialized, especially in light of the balance that must be attained between luxury and comfort and the various strict guidelines and requirements which must be met by any design prior to installation into an aircraft. In particular, the FAA is charged with setting forth the various guidelines and requirements which must be met by aircraft components, and in doing so has established a series of dynamic and static tests which test the minimum load or impact requirements of an aircraft component, and an aircraft seat in particular. For example, relevant FAA regulations which the manufacturers of aircraft seats are required to meet are found in FAR 25,562; NAS 809; and AS 8049.

As with many federal safety regulations, it is not until after ratification of new guidelines that the increased safety requirements take affect in the market place. Such is the case with the most recent FAA requirements calling for even greater safety of aircraft components that must first successfully complete testing under substantially greater forces and impacts. For the most part the new FAA regulations are just now beginning to affect manufacturers of aircraft components and consequently, the availability of such products for consumers to choose from.

Specifically, there are presently a number of dynamic tests which an aircraft seat must undergo in order to test various parts of the structural integrity of the seat frame and to determine its safety and viability. One such test involves essentially a simulation of a head-on impact, wherein a substantial amount of force and/or strain is placed on the aircraft seat frame, first on the foundation and base of the aircraft seat, and subsequently, on the seat back portion of the frame as would be the case in a crash situation. The aircraft seat frame must be able to withstand vertical impact forces on its foundation and base, as well as horizontal or buckling forces on the seat back frame itself. The FAA's new requirements have substantially increased the amount of such forces which the aircraft seat frame must withstand during testing.

Presently, most conventional aircraft seat frame designs include generally thick walled metal tubing having rounded or squared configurations. In order to save weight, however, this tubing is generally hollow making it much more susceptible to bending or buckling. In particular, during the various impact tests, the seat foundation and seat base are subject to focused vertical forces which tend to bend the tubing. In order to overcome the increased susceptibility of the tubing to bending, especially under the more stringent FAA testing and safety requirements, prior art seat frame designs seek to increase the wall thickness and/or material thickness of the tubing, and/or seek to add additional tubing reinforcement members. While many of these prior art "solutions" provide sufficient strength to meet safety and testing requirements, there are several drawbacks associated therewith. In particular, and as previously mentioned, the increased cost associated with the use of more material and components is a significant disadvantage to such prior art seat frame designs, but the most significant consideration associated with aircraft design in general has to do with the weight of the components. In particular, most aircraft regulations have some significant size-to-weight requirements for the aircraft, meaning that less seating or cut-backs in other amenities must be implemented to meet the requirements. More importantly, however, for every added pound an aircraft must carry, the fuel consumption of that aircraft increases exponentially. Given the already expensive cost of aircraft fuel, and the many miles and hours lodged by the aircraft, a substantial increase of fuel consumption, not to mention a substantial increases in wear which leads to earlier replacement requirements, significantly increase the up-keep costs of the aircraft. Accordingly, the strength-to-weight ratio can be said to be one of the most important criteria associated with aircraft design and aircraft interior design.

Additionally, aircraft seats are required to undergo what is known as a yaw test wherein the seat is propelled forward to an impact at a certain angle. As a result, when this test is performed, and further due to the use of a shoulder harness on some customized seat designs, a majority of the force of impact on the seat back will be focused at a single upper corner of the seat back and not the overall seat back. Presently, most conventional aircraft seat backs include the rounded or squared steel tubing to comprise the structure of the seat back. Such conventional seat backs, however, upon undergoing the yaw test will translate the majority of the impact through a single side rail of the seat back portion into the seat foundation. While most seat foundations will include a recline cylinder at one side of the seat frame which helps to provide some increased resistance to that force, most existing seat designs leave the side opposite the recline cylinder un-reinforced. Accordingly, if the force of impact in the 10 degree yaw test is directed at an opposing corner from the side at which the recline cylinder is mounted, the un-reinforced side of the seat foundation frame will bear all or most of the impact and is likely to fail. Consequently, seat frames known in the art are now being forced to provide substantially increased strength and/or thicker tubing in the seat foundation and seat back, or are unnecessarily utilizing a second recline cylinder disposed at the previously un-reinforced side of the seat foundation. These designs, however, while providing sufficiently increased impact resistance, also substantially increase the cost of the seat frame in materials and added parts, and more importantly will substantially increase the weight of the aircraft seat frame.

Still another FAA test preformed on aircraft seat frames, which has also recently been increased in severity, involves the buckling or flexing of the underlying support surface. Specifically, in certain crash situations, the underlying support surface or floor of the aircraft to which the seats are secured may tend to buckle, flex or otherwise bend. While this floor is preferably structured to maintain some sort of structural integrity during a crash situation, most conventional floor surfaces will waiver or buckle a substantial amount, partly to dissipate the impact forces and maintain its general, overall integrity. Still, however, the aircraft seat must be rigidly secured to the underlying support surface, thereby making it very susceptible to becoming completely or partially dislodged from the underlying support surface during such testing. As result, and in an attempt to solve the problems associated with such testing, others in the art have turned to larger, bulkier and accordingly, heavier securing structures to mount the seat to the underlying support surface. Such increases, however, can significantly add to the cost and overall weight of the seat, and can sometimes function to lessen the ability of the underlying support surface to maintain its structural integrity during the testing.

Accordingly, there is a substantial need in the art to provide an aircraft seat frame which is capable of meeting the new and increased safety and testing requirements set forth by the FAA, and which at the same time is not substantially more heavy in weight and which does not have a greatly increased cost associated with production nor with the materials needed. As will be appreciated by those skilled in the art, if either the weight of or the cost associated with the aircraft seat frame is increased, it will severely and negatively impact the ability of the aircraft owner to fully equip the aircraft with as many passenger seats as possible and/or with other needed or desired equipment.

SUMMARY OF THE INVENTION

The present invention is directed towards an aircraft passenger seat frame to be mounted within a private or commercial aircraft. In particular, the aircraft seat frame will include a seat back portion, a seat foundation portion, and a seat base portion, all of which make up the frame which is to bear a substantial portion of the force exerted on the aircraft seat.

The seat back portion of the aircraft includes a pair of spaced, generally vertically disposed side rails which define a width of the seat back. Each of these side rails include a leading edge segment, a trailing edge segment, and an interior segment, all of which have a generally flat, planar configuration. Further, so as to define the side rails, the leading edge segment is disposed at a front edge of the interior segment, in substantially perpendicular relation thereto, and the trailing edge segment is disposed at a rear edge of the interior segment, in substantially perpendicular relation thereto. As such, the leading, trailing, and interior segments of the side rails have a generally "T" shaped configuration in cross section, and are disposed relative to one another so as to substantially maximize the side rails resistance to horizontal bending across a plane of the leading and trailing segments. Additionally, the specific and structure and positioning of the leading, trailing, and interior segments maximize the strength of the side rails while minimizing an overall weight of the side rails and therefor, weight of the aircraft seat frame attributable to the seat back portion.

Also included in the seat back portion is a load transference member. The load transference member is disposed to span the interior segments of the side rails at a generally lower end thereof. Accordingly, the load transference member, which has a generally tubular configuration, transfers a portion of a load exerted on one of the side rails to a second of the side rails. The load transferring member substantially prevents a single side of the aircraft seat frame from having to bear the brunt of the load exerted on the seat frame.

Turning to the seat foundation portion of the aircraft seat frame, it is secured to the seat back portion such that a load exerted on the side rails of the seat back portion is translated into the seat foundation portion. Further, the seat foundation portion is supportably disposed on a seat base portion that is structured and disposed to be secured to an underlying support surface.

Specifically, the seat base portion includes primarily a pair of spaced base rails. Much like the side rails of the seat back portion, the base rails include an upper edge base segment, a lower edge base segment, and an interior base segment, each having a generally flat, planar configuration. In the base rails, the upper edge base segment is disposed at the top edge of the interior base segment, in substantially perpendicular relation thereto, and a lower base segment is disposed at a bottom edge of the interior base segment, in substantially perpendicular relation thereto. Accordingly, the base rail will also have a generally "T" shaped configuration in cross section, and further, will be substantially resistant to vertical bending across the plane of the upper edge and lower edge base segments, while minimizing an overall weight of the base rails, and similarly, weight of the seat frame.

Also included with the base rails of the seat base portion are at least two mount segments extending downwardly towards the underlying support surface. Each of these mount segments includes a retention segment which receives a support member therein. The support member is structured to be rigidly secured directly to the underlying support surface, while being secured to the mount segment in such a manner as to be pivotable relative thereto upon a buckling or flexing of the underlying support surface.

It is an object of the present invention to provide an aircraft seat frame having a substantially high strength-to-weight ratio, thereby minimizing the overall weight of the aircraft seat frame while simultaneously providing a seat frame which is strong enough to withstand the new load requirements and increased safety requirements as set forth by FAA regulations.

Yet another object of the present invention is to provide an aircraft seat frame having a seat back that is relatively lightweight and structured to substantially withstand a bending force.

It is also an object of the present invention is to provide an aircraft seat frame having a seat back portion capable of distributing a load exerted thereon in a balanced manner over the seat back portion, thereby preventing an excessive, focused load on only half of the frame.

Another object of the present invention is to provide an aircraft seat frame having a foundation which is relatively lightweight and capable of withstanding vertical loads commensurate with the loads exerted during FAA dynamic testing procedures.

Yet another object of the present invention is to provide an aircraft seat frame having a foundation portion that is relatively lightweight and capable of withstanding substantial loads such as those associated with FAA dynamic testing for minimal air worthiness.

It is also an object of the present invention is to provide an aircraft seat frame structured to remain securely mounted on an underlying support surface despite flexing and/or buckling of the underlying support surface commensurate with the flexing or buckling caused during FAA dynamic testing procedures.

An additional object of the present invention is to provide an aircraft seat frame which is capable of passing the FAA's ten (10) degree yaw test.

Yet another object of the present invention is to provide an aircraft seat frame of substantially lightweight construction which is capable of passing all of the FAA safety requirements for air-worthiness of aircraft seat frames.

Another object of the present invention is to provide an aircraft seat frame of substantially strong, yet lightweight construction which is capable of plastically deforming under substantial loads and thereby absorbing energy that would otherwise be transferred to an occupant seated within the aircraft seat.

BRIEF DESCRIPTION OF THE DRAWINGS

For a fuller understanding of the nature of the present invention, reference should be had to the following detailed description taken in connection with the accompanying drawings in which:

FIG. 2 is front plan view of the seat back portion of the present invention.

FIG. 3 is top plan view of the seat foundation portion of the present invention.

FIG. 3A is front plan view of the seat foundation portion of the present invention.

FIG. 3B is side plan view of the seat foundation portion of the present invention.

FIG. 4B is a side plan view of the seat base of the present invention.

Like reference numerals refer to like parts throughout the several views of the drawings.

DETAILED DESCRIPTION OF THE PREFERRED EMBODIMENT

Figure 1:
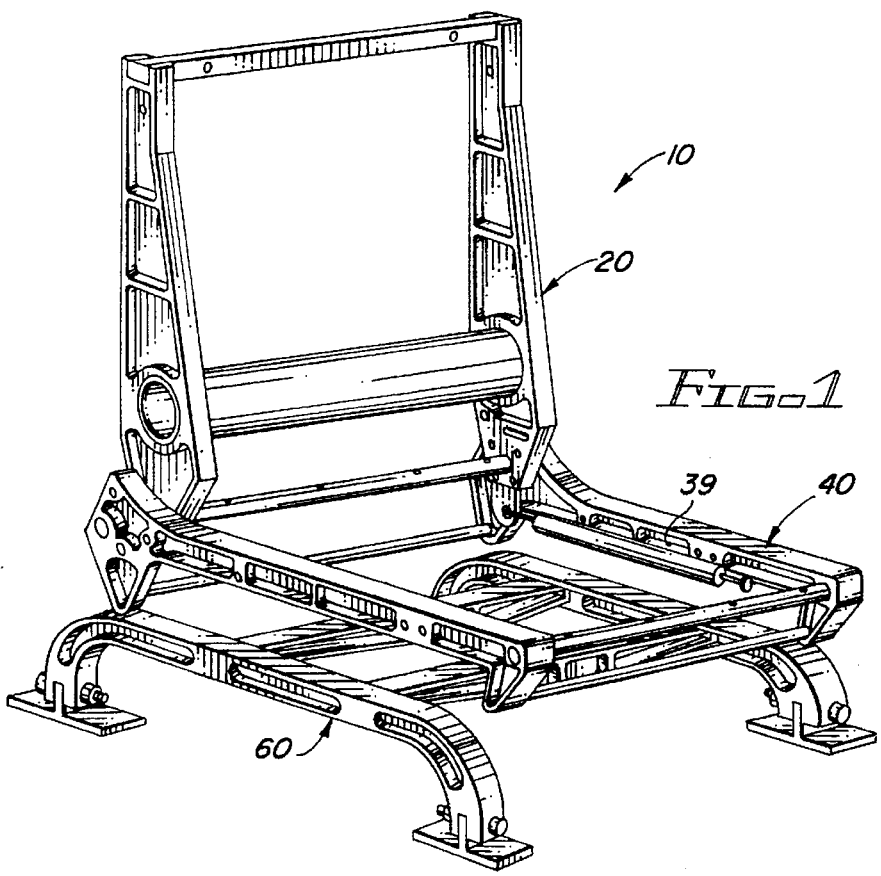
FIG. 1 is a perspective view of the aircraft seat frame of the present invention.

Shown throughout the figures, the present invention is directed towards an aircraft seat frame, generally indicated as 10. The seat frame 10 includes primarily a seat back portion 20, a seat foundation portion 40, and a seat base 60 interconnected with one another so as to form the complete seat frame 10. Preferably, one or more additional elements such as arm rests, swivel or pivot interconnections between the foundation portion 40 and base portion 60, a seat pan, etc. are also included, but not shown for clarity.

Turning specifically to FIGS. to 1, 2 and 2A, the aircraft seat frame 10, includes a seat back portion 20. The seat back portion 20 includes primarily a pair of spaced, generally vertically disposed side rails 22 and 22' which will generally define a width of the seat back portion 20. Each of the side rails 22 and 22' include a leading edge segment 24, a trailing edge segment 26, and an interior segment 28. All of these segments 24, 26 and 28 which are preferably formed of a strong metal such as high-strength aluminum (or possibly even steel or an equivalent alloy), have a generally flat, planar configuration. In fact, the segments 24, 26 and 28 are generally thin having a greater width along which their primary strength is focused, and it will be appreciated by those skilled in the art that the width of these segments may be increased to withstand greater loads.

Figure 2A:
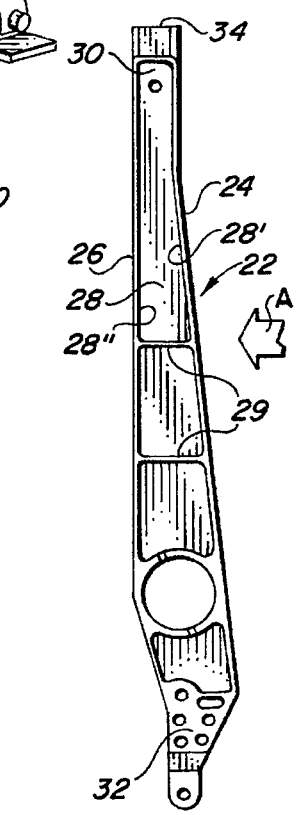
FIG. 2A is a side plan view of the seat back portion of the present invention.

As illustrated in FIG. 2A, the leading edge segment 24 of side rail 22 is disposed at a front edge 28' of the interior segment 28, in substantially perpendicular relation thereto. Conversely, the trailing edge 26 is disposed at a rear edge 28" of the interior segment 28 in a substantially perpendicular relation thereto. As such, the side rail 22 will have a generally I-shaped cross-sectional configuration. This configuration and interconnection between the leading edge segment 24, the trailing edge segment 26 and the interior segment 28, will enable side rail 22 to resist a substantial force exerted across a plane of the leading and trailing edge segments 24 and 26, and as depicted in FIG. 2A by the arrow A, this force would otherwise tend to horizontally bend the side rail 22. Further, the increased resistance of side rail 22 to horizontal bending exists and is evident despite having a substantially minimal overall weight. More specifically, a force directed along line A as shown in FIG. 2A will tend to bend or bow the side rail 22 along a width of the interior segment 28; however, due to the increased width-to-thickness ratio, force A would need to be extreme in order to result in any corresponding horizontal bending of side rail 22.

In the preferred embodiment, the leading edge, trailing edge, and interior segments 24, 26 and 28 are integrally formed with one another of the high-strength metal. Further, a number of reinforcing segments 29 may be included for additional support. Additionally, as illustrated in the figures, the side rails 22 and 22' are interconnected with one another by a crossing support 34 spanning the side rails 22 and 22' at a generally upper end 30 thereof. It should be noted, however, that crossing support 34, which preferably has a hollow, tubular configuration, is disposed primarily to define the necessary shape, and to secure and stabilize the side rails 22 and 22' with one another, and not to bear the brunt of a load. Further, spanning the side rails 22 and 22' at generally a lower end 32 is a load transference member 36 which will be discussed in greater detail subsequently.

The aircraft seat frame of this invention may also include a seat foundation 40 which is preferably connected directly with the side rails 22 and 22' of the seat back portion 20. Seat foundation portion 40 has a generally planar, horizontal orientation and is structured to receive the seat portion of the overall aircraft seat. Turning to FIGS. 3–3B, included in the seat foundation portion 40 of the aircraft seat frame 10 are preferably a pair of spaced seat side rails 42 and 42', each of which have an upper edge segment 44, a lower edge segment 46, and an interior foundation segment 48. These various segments 44, 46 and 48 all have a generally flat, planar configuration with the upper edge segment 44 being disposed at a top edge 48' of the interior foundation segment 48, in substantially perpendicular relation thereto, and the lower edge segment 46 disposed at a bottom edge 48" of the interior foundation segment 48, also in substantially perpendicular relation thereto. As such, the upper edge, lower edge, and interior foundation segments 44, 46 and 48 have a generally "T" shaped cross-sectional configuration and further, are disposed relative to one another so as to substantially maximize the seat side rails' 42 and 42' resistance to vertical bending across a plane of the upper edge and lower edge segments 44 and 46, as illustrated by the arrow B in FIG. 3B.

Disposed in spanning relation between the seat side rails 42 and 42', in preferably a spaced apart distance from one another, are a pair of cross supports 50. These cross supports 50 help set the spacing between the side rails 42 and 42'. Also, some additional vertical support segments 49 may be disposed between the upper and lower segments 44 and 46. Further, as best seen in FIG. 3B, the front and rear ends 51 and 52 of the seat side rails 42 and 42' preferably will include downwardly depending segments 54 and 56 to facilitate secure fastening to underlying support objects. Although these downwardly depending portions 54 and 56 may be secured directly to the seat base portion 60, in most preferred model aircraft seats, the foundation portion 40 is secured to a swivel and/or guide rail means (not shown) which enable the seat foundation portion 40 and seat back portion 20 of the frame 10 to swivel and/or move laterally relative to the seat base portion 60 which is necessarily fixedly secured to an underlined support surface.

Additionally, as previously recited, the seat back portion 20 is interconnected with and secured to the seat foundation portion 40 and is also structured to recline relative thereto. Accordingly and as illustrated in FIG. 1, a recline cylinder 39 is preferably secured to one of the seat side rails 42' of the seat foundation portion 40 so as to engage one of the side rails 22' of the seat back portion 20. The recline cylinder 39 may be any conventionally implemented type of recline cylinder which when disengaged allows a user to selectively recline their seat and when engaged will function to lock the seat back portion 20 in one of a plurality of reclining orientations relative to the seat foundation portion 40.

Referring now to FIGS. 2 and 2A, the seat back portion 20 also preferably includes a load transference member 36. The load transference member 36 is preferably in the form of a generally round torque tube which spans the side rails 22 and 22' and is secured at a generally lower end 32 of the side rails 22 and 22'. This torque tube is a hollow round tubing such that when a force is exerted on one of the side rails 22 or 22' but not on the other, the force will nonetheless be generally evenly distributed on rails 22 and 22' because torque tube 36 translates the force therethrough. In particular, in a 10 degree yaw test, the seat is directed towards impact at an angle. Consequently, one side of the seat frame 10 will feel the force before the other. This unbalanced force, especially in combination with the focused, one sided force that results from conventional shoulder harnesses that extend from a single side much like a conventional auto seat belt, causes a complete translation from one side rail of the seat back portion to one seat side rail of the seat foundation portion if not compensated. Although many seat designs do include recline cylinders on one side, which helps resist the focused force of the yaw test, if the test is performed at the opposite angle, which is usually the case, a single unreinforced side of the seat foundation may not be strong enough to withstand the entire focused force of the impact. The torque tube 36, therefore, due to its natural tendency to torque under unbalanced forces, will transfer enough of the force into the other side of the frame such that additional reinforcements or recline cylinders are not necessary to pass the test and withstand the force. Additionally, in the preferred embodiment, the interior segments 28 of each of the side rails 22 and 22' include a generally tapered configuration wherein a width of the interior segment 28 at an upper portion thereof is generally less than a width of a lower portion thereof. Accordingly, the spacing distance on interior segment 28 between the leading edge segment 24 and the trailing edge segment 26 at the upper portion of the interior segment 28 is less than the spacing distance between the leading edge segment 24 and the trailing edge segment 26 at the lower portion of the interior segment 28. This offers two advantages: first, that a torque tube 36 having a larger diameter can be utilized and second, that a greater resistance to bending are achieved at the lower end of the side rails 22 and 22'.

Figure 4:
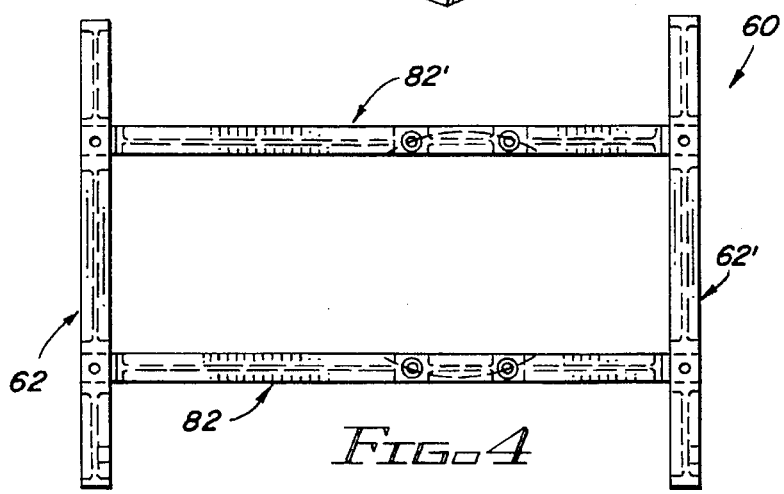
FIG. 4 is a top plan view of the seat base portion of the present invention.
Figure 4A:
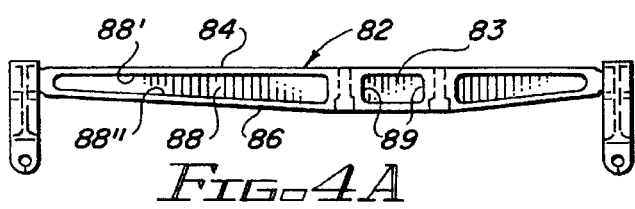
FIG. 4A is a front plan view of the seat base portion of the present invention.

Turning to FIGS. 4, 4A and 4B, the seat base portion 60 of the aircraft seat frame 10 preferably includes a pair of spaced base rails 62 and 62'. As seen in FIG. 4B, each of the base rails 62 and 62' will include an upper edge base segment 64, a lower edge base segment 66, and an interior base segment 68, all of which have a generally flat, planar configuration. Much like the rails of the previously recited portions of the aircraft seat frame 10, which have a generally I-shaped cross sectional configuration, the upper edge base segment 64 is disposed at a top edge 68' of the interior base segment 68, in substantially perpendicular relation thereto, while the lower edge base segment 66 is disposed at a bottom edge 68" of the interior base segment 68, in substantially perpendicular relation thereto. As such, the upper edge, lower edge, and interior base segments 64, 66 and 68 will as a result of their interconnection and configuration minimize an overall weight of the base rails 62 and 62', while maximizing the base rails 62 and 62' resistance to vertical bending across a plane of the upper edge and lower edge base segments 64 and 66, as illustrated graphically by the arrow C.

As illustrated in FIGS. 4 and 4A, the seat base portion 60 preferably includes at least two spaced spar rails 82 and 82' disposed in spanning relation between the spaced base rails 62 and 62'. These spar rails 82 and 82' are secured at opposite ends thereof to the base rails 62 and 62', such as at a vertical reinforcing segment 69 in the base rails 62 and 62'. Referring to FIG. 4A, each of the spar rails 82 and 82' preferably includes an upper edge spar segment 84, a lower edge spar segment 86, and an interior spar segment 88, each having a generally flat, planar configuration. Preferably, the upper and lower edge spar segments 84 and 86 are disposed at the respective top and bottom edges 88' and 88" of the interior spar segments 88, in substantially perpendicular relation thereto, so as to minimize vertical bending across a plane of the upper edge and lower edge spar segments 84 and 86. Additionally, as illustrated in FIG. 4A, each of the spar segments 82 and 82' will preferably include an increased width mid-portion 83, which can be bounded by some additional vertical supports 89. This mid-portion 83 of the spar rails 82 and 82' is structured to preferably receive a swivel mechanism and/or transverse sliding means to which the seat foundation portion 40 is secured. Accordingly, this mid-portion 82 will be able to support the greater load and will be more resistant to vertical bending.

Returning to FIG. 4B, the base rails 62 and 62' of seat base portion 60, will each preferably include at least two mount segments 70 and 70' extending preferably from opposite ends thereof. The mount segments 70, are structured to extend downwardly from the base rails 62 and 62' towards the underlying support surface. Additionally it is preferred that in a dynamic aircraft passenger seat, the mount segments include a retention segment 72 at a distal most end thereof which is structured to receive a support member 75 therein. The support members 75 are preferably of a rigid, solid construction, and also preferably include a generally T-shaped configuration, an upper portion of which is structured to be secured in the retention segments 72 and a lower portion of which is structured to be secured to the underlying support surface. While support member 75 is structured to be rigidly and fixedly secured to the underlying support surface, it will be noted however that through an upwardly depending flange 76 the support member 75 is secured to the retention segment 72 so as to be pivotable relative thereto. In particular, an elongate bolt or rivet 77 or other such fastening means extend through the retention segment 72 and the depending flange 76 of the support member 75 such that the support member 75 will be able to pivot slight amounts relative to the retention segment 72 upon buckling or flexing of the underlying support surface. Specifically, during normal operation, the support member 75 remains rigid and non-movably secured to the retention segment 72; however, upon buckling or bending of the underlying support surface, the axial connection of the support member 75 permits it to pivot slight amounts under the strain of the moving underlying support surface. This slight pivoting will thereby ensure that the support member 75 remains acceptably secured with the underlying support surface and does not get easily pulled out due to the weight of the seat frame 10.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

Now that the invention has been described,

What is claimed is:

1. An aircraft seat frame comprising:
   (a) a seat back portion, said seat back portion including:
      a pair of spaced, generally vertically disposed side rails structured to generally define a width of said seat back,
      each of said side rails including a leading edge segment, a trailing edge segment, and an interior segment, each of said segments having a generally flat, planer configuration,
      said leading edge segment being disposed at a front edge of said interior segment in substantially perpendicular relation thereto,
      said trailing edge segment being disposed at a rear edge of said interior segment in substantially perpendicular relation thereto,
      said leading, trailing, and interior segments being disposed relative to one another so as to substantially maximize a resistance of said side rails to horizontal bending across a plane of said leading and trailing edge segments, while minimizing an overall weight of said side rails,
   (b) a load transference member spanning said interior segments of said side rails at generally a lower end of said side rails and secured thereto in a generally flush, perpendicular relation,
      said load transference member having a generally tubular configuration and being structured and disposed to transfer a portion of a load exerted on one of said side rails to a second of said side rails, and
      said load transference member having a diameter greater than a width of an upper portion of said side rails, so as to maximize a load transference thereof, while including a minimal wall thickness so as to minimizing a weight of said load transference member,
   (c) a seat foundation portion, said seat foundation portion being secured to said seat back portion such that a load exerted on said side rails of said seat back portion is translated into said seat foundation portion, and
   (d) said seat foundation portion being substantially disposed on a seat base portion structured and disposed to be secured to an underlying support surface.

2. An aircraft seat frame as recited in claim 1 wherein said interior segment of each of said side rails of said seat back includes a generally tapered configuration wherein said width of said interior segment at said upper portion thereof is generally less than a width of a said lower portion thereof such that a spacing between said leading edge segment and said trailing edge segment at said upper portion of said interior segment is less than a spacing between said leading edge segment and said trailing edge segment at said lower portion of said interior segment.

3. An aircraft seat frame as recited in claim 1 wherein said seat back portion is structured to recline relative to said seat foundation portion.

4. An aircraft seat frame as recited in claim 1 wherein said seat foundation portion comprises:
   a pair of seat side rails disposed a spaced apart distance from one another so as to generally define a width of said seat foundation portion,
   each of said seat side rails including an upper edge segment, a lower edge segment, and an interior foundation segment, each of said segments having a generally flat, planar configuration,
   said upper edge segment being disposed at a top edge of said interior foundation segment in substantially perpendicular relation thereto,
   said lower edge segment being disposed at a bottom edge of said interior foundation segment in substantially perpendicular relation thereto,
   said upper, lower, and interior foundation segments being disposed relative to one another so as to substantially maximize a resistance of said seat side rails to vertical bending across a plane of said upper and lower segments, while minimizing an overall weight of said seat side rails, and
   a pair of cross supports disposed a spaced apart distance from one another in spanning relation between said seat side rails.

5. An aircraft seat frame as recited in claim 4 further including a recline cylinder secured to one of said seat side rails of said seat foundation portion and structured to engage one of said side rails of said seat back portion so as to lock said seat back portion in one of a plurality of reclining orientations relative to said seat foundation portion.

6. An aircraft seat frame as recited in claim 1 wherein said seat base portion comprises:
   a pair of spaced base rails,
   each of said base rails including an upper edge base segment, a lower edge base segment, and an interior base segment, each of said segments having a generally flat, planar configuration,
   said upper edge base segment being disposed at a top edge of said interior base segment in substantially perpendicular relation thereto,
   said lower edge base segment being disposed at a bottom edge of said interior base segment in substantially perpendicular relation thereto,
   said upper edge, lower edge, and interior base segments being disposed relative to one another so as to substantially maximize a resistance of said seat side rails to vertical bending across a plane of said upper edge and lower edge base segments, while minimizing an overall weight of said base rails, and
   each of said base rails further including at least two mount segments extending downwardly therefrom towards the underlying support surface.

7. An aircraft seat frame as recited in claim 6 wherein said mount segments further include a retention segment structured and disposed to receive a support member therein, said support member being rigidly, secured directly to the underlying support surface and being secured to said mount segment at said retention segment so as to pivot relative thereto upon a buckling of the underlying support surface.

8. An aircraft seat frame as recited in claim 7 wherein said mount segment is integrally formed with said base rails.

9. An aircraft seat frame as recited in claim 1 wherein said seat base portion further comprises:
   at least two spaced spar rails, supportingly secured between said spaced base rails,
   each of said spar rails including an upper edge spar segment, a lower edge spar segment, and an interior spar segment, each of said spar segments having a generally flat, planar configuration,
   said upper edge spar segment being disposed at a top edge of said interior spar segment in substantially perpendicular relation thereto, said lower edge spar segment being disposed at a bottom edge of said interior spar segment in substantially perpendicular relation thereto, and said upper edge, lower edge, and interior spar segments being disposed relative to one another so as to substantially maximize a resistance of said seat side rails to vertical bending across a plane of said upper edge and lower edge spar segments, while minimizing an overall weight of said spar rails.

10. An aircraft seat frame as recited in claim 9 wherein said interior spar segment of said spar rails includes an increased width mid portion over which said seat foundation portion is secured to said seat base portion.

11. An aircraft seat frame comprising:
(a) a seat back portion, said seat back portion including:
a pair of spaced side rails structured to generally define a width of said seat back,
a load transference member spanning said side rails at generally a lower end of said side rails and secured thereto in a generally flush, perpendicular relation,
said load transference member having a generally tubular configuration and being structured and disposed to transfer a portion of a load exerted on one of said side rails to a second of said side rails, and
said load transference member having a diameter greater than a width of an upper portion of said side rails, so as to maximize a load transference thereof, while including a minimal wall thickness so as to minimize a weight of said load transference member, and
(b) a seat foundation portion, said seat back portion being secured to said seat foundation portion such that the load exerted on said side rails of said seat back portion is translated into said seat foundation portion.

12. An aircraft seat frame as recited in claim 11 wherein each of said side rails includes:
a leading edge segment, a trailing edge segment, and an interior segment, each of said segments having a generally flat, planar configuration,
said leading edge segment being disposed at a front edge of said interior segment in substantially perpendicular relation thereto,
said trailing edge segment being disposed at a rear edge of said interior segment in substantially perpendicular relation thereto, and
said leading, trailing, and interior segments being disposed relative to one another so as to substantially maximize a resistance of said seat side rails to horizontal bending along a plane of said leading and trailing segments, while minimizing an overall weight of said side rails.

13. An aircraft seat frame as recited in claim 12 wherein said load transference member spans said interior segments of said side rails.

14. An aircraft seat frame comprising:
(a) a seat back portion, said seat back portion including at least two spaced side rails,
a load transference member spanning said side rails at generally a tower end of said rails and secured thereto in a generally flush, perpendicular relation,
said low transference member having a generally tubular configuration and being structured and disposed to transfer a portion of a load exerted on one of said side rails to a second of said side rails, and
said load transference member having a diameter greater than a width of an upper portion of said side rails, so as to maximize a load transference thereof, while including a minimal wall thickness so as to minimize a weight of said load transference member, and
(b) a seat foundation portion, said seat foundation portion being secured to said seat back portion such that a load exerted on said side rails of said seat back portion is translated into said seat foundation portion,
(c) a seat base portion, said seat foundation portion being supportably disposed on said seat base portion which is structured and disposed to be secured to an underlying support surface,
(d) said seat base portion comprising:
a pair of spaced base rails,
each of said base rails including an upper edge base segment, a lower edge base segment, and an interior base segment, each of said segments having a generally flat, planer configuration,
said upper edge base segment being disposed at a top edge of said interior base segment in substantially perpendicular relation thereto,
said lower edge base segment being disposed at a bottom edge of said interior base segment in substantially perpendicular relation thereto,
said upper edge, lower edge, and interior base segments being disposed relative to one another so as to substantially maximize a resistance of said base rails to vertical bending across a plane of said upper edge and lower edge base segments, while minimizing an overall weight of said base rails,
each of said base rails further including at least two mount segments extending downwardly therefrom towards the underlying support surface,
said mount segments including a retention segment structured and disposed to receive a support member therein, and
said support member being rigidly, secured directly to the underlying support surface and being secured to said mount segment at said retention segment so as to pivot relative thereto upon a buckling of the underlying support surface.

15. An aircraft seat frame as recited in claim 14 wherein said mount segment is integrally formed with said base rails.

* * * * *